US006451908B1

(12) United States Patent
Koonce et al.

(10) Patent No.: US 6,451,908 B1
(45) Date of Patent: Sep. 17, 2002

(54) POLYURETHANE FILMS PREPARED FROM POLYURETHANE DISPERSIONS

(75) Inventors: William A. Koonce, Pearland; Franklin E. Parks, Jones Creek; Debkumar Bhattacharjee, Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/548,823

(22) Filed: Apr. 13, 2000

Related U.S. Application Data
(60) Provisional application No. 60/129,279, filed on Apr. 14, 1999.

(51) Int. Cl.[7] .............................. C08J 3/00; C08K 3/20; C08L 75/00; C08G 18/00; C08G 18/81
(52) U.S. Cl. ........................... 524/591; 2/161.7; 2/168; 427/372.2; 427/385.5; 428/423.1; 524/589; 524/590; 524/839; 524/840; 528/44; 528/45; 528/49; 604/327; 604/328; 604/347
(58) Field of Search .................... 524/591, 839, 524/840, 589, 590; 528/44, 49, 45; 428/423.1; 427/385.5, 372.2; 604/328, 327, 347; 2/161.7, 168

(56) References Cited

U.S. PATENT DOCUMENTS

| | | | |
|---|---|---|---|
| 2,968,575 A | 1/1961 | Mallonee | 106/287 |
| 3,148,173 A | 9/1964 | Axelrood | 260/75 |
| 3,178,310 A | 4/1965 | Berger et al. | 117/142 |
| 3,210,302 A | 10/1965 | Bowell et al. | 260/18 |
| 3,294,724 A | 12/1966 | Axelrood | 260/29.2 |
| 3,360,599 A | 12/1967 | Nyberg et al. | 264/216 |
| 3,401,133 A | 9/1968 | Grace et al. | 260/29.2 |
| 3,410,817 A | 11/1968 | McClellan et al. | 260/29.2 |
| 3,437,624 A | 4/1969 | Dawn et al. | 260/29.2 |
| 3,488,272 A | 1/1970 | Frisch et al. | 204/181 |
| 3,503,917 A | 3/1970 | Burke | 260/29.6 |
| 3,563,943 A | 2/1971 | Davis et al. | 260/29.2 |
| 3,826,768 A | 7/1974 | Suzuki et al. | 260/29.2 TN |
| 3,919,173 A | 11/1975 | Coyner et al. | 260/77.5 |
| 3,997,592 A | 12/1976 | Aufdermarsh, Jr. | 260/471 C |
| 4,046,729 A | 9/1977 | Scriven et al. | 260/29.2 TN |
| 4,066,591 A | 1/1978 | Scriven et al. | 260/29.2 TN |
| 4,119,602 A | 10/1978 | Isgur et al. | 260/29.6 NR |
| 4,123,403 A | 10/1978 | Warner et al. | 260/29.2 EP |
| 4,147,679 A | 4/1979 | Scriven et al. | 260/29.2 TN |
| 4,292,226 A | 9/1981 | Wenzel et al. | 260/29.2 |
| 4,374,209 A | 2/1983 | Rowlands | 521/116 |
| 4,431,763 A | 2/1984 | Reed | 524/389 |
| 4,433,095 A | 2/1984 | Hombach et al. | 524/563 |
| 4,442,259 A | 4/1984 | Isgur et al. | 524/839 |
| 4,444,976 A | 4/1984 | Rabito | 528/60 |
| 4,501,852 A | 2/1985 | Markusch et al. | 524/591 |
| 4,507,413 A | 3/1985 | Thoma et al. | 524/42 |
| 4,540,633 A | 9/1985 | Kucera et al. | 428/423.1 |
| 4,558,090 A | 12/1985 | Drexler et al. | 524/591 |

(List continued on next page.)

FOREIGN PATENT DOCUMENTS

| | | | |
|---|---|---|---|
| DE | 197 08 451 A1 | 9/1998 | C08L/75/04 |
| EP | 0 167 188 A1 | 1/1986 | C08F/283/00 |
| EP | 0 279 198 A | 8/1988 | C08G/18/10 |
| EP | 0 741 152 A1 | 11/1996 | C08G/18/08 |
| GB | 1243604 | 8/1971 | C08G/22/04 |
| GB | 1432112 | 4/1976 | C08G/18/10 |
| GB | 2316948 A | 3/1998 | C08G/18/66 |
| JP | 49047427 A | 5/1974 | C08G/18/12 |
| JP | 55052359 | 4/1980 | C09D/3/58 |
| JP | 02204032 | 8/1990 | B32B/27/08 |
| JP | 05005094 | 1/1993 | C09K/3/16 |
| JP | 09165425 | 6/1997 | C08F/299/06 |
| JP | 10161397 | 6/1998 | C08L/71/00 |
| WO | 95/08583 | 3/1995 | C08G/18/46 |
| WO | 96/08352 | 3/1996 | B28B/1/38 |
| WO | 97/42247 | 11/1997 | C08G/18/62 |
| WO | WO 98/31760 | 7/1998 | |
| WO | WO 98/41522 | 9/1998 | |
| WO | WO 98/41554 | 9/1998 | |

OTHER PUBLICATIONS

Saunders et al., "Polyurethanes, Part I. III Polyethers," Polyurethane, Chemistry and Technology, vol. 1, pp. 32–42 and 44–54 (1962).

Saunders et al., "Flexible Foams, Part VII. 2. Polyois, " Polyurethane, Chemistry and Technology, vol. 2, pp. 5–6 and 198–199 (1964).

Saunders, "Organic Polymer Chemistry," pp. 323–325 (1973).

Buist, ed. "Developments in Polyurethanes," vol. 1, pp. 1–76 (1978).

"Standard Test Methods for Polyurethane Raw Materials: Determination of Unsaturation of Polyos." The American Society for Testing and Materials. D4671–99.

Primary Examiner—Patrick D. Niland

(57) ABSTRACT

A process for preparing a polyurethane film comprising two steps is disclosed. The first step comprises preparing a nonionic prepolymer formulation, the prepolymer formulation comprising a diisocyanate, an active hydrogen containing material, and a monol. The second step comprises preparing an aqueous dispersion of the prepolymer, in the presence of a surfactant. Both steps occur in the substantial absence of an organic solvent. Also disclosed is a polyurethane film and an aqueous dispersion useful for preparing such films. The present invention has the advantage of having increased shear stability. The dispersions of the present invention do not settle or coagulate prematurely. Moreover, the films of the present invention do not include the dermal irritants which occur in natural rubber latex. The films and dispersions of the present invention are thus suitable for use in applications such as, for example, medical applications.

24 Claims, No Drawings

U.S. PATENT DOCUMENTS

| | | | |
|---|---|---|---|
| 4,742,095 A | 5/1988 | Markusch et al. | 523/322 |
| 5,037,864 A | 8/1991 | Anand et al. | 523/348 |
| 5,043,381 A | 8/1991 | Coogan et al. | 524/591 |
| 5,071,904 A | 12/1991 | Martin et al. | 524/458 |
| 5,185,200 A | 2/1993 | Tirpak et al. | 428/288 |
| 5,227,422 A | 7/1993 | Mitsuji et al. | 524/457 |
| 5,281,655 A | 1/1994 | Mitsuji et al. | 524/507 |
| 5,364,573 A | 11/1994 | Noky | 264/40.1 |
| 5,364,973 A * | 11/1994 | Pazos | 568/62 |
| 5,494,960 A | 2/1996 | Rolando et al. | 524/591 |
| 5,539,021 A | 7/1996 | Pate et al. | 523/335 |
| 5,569,706 A | 10/1996 | Jacobs et al. | 524/591 |
| 5,576,382 A * | 11/1996 | Seneker et al. | 524/591 |
| 5,589,563 A | 12/1996 | Ward et al. | 528/44 |
| 5,677,357 A | 10/1997 | Spicher | 521/85 |
| 5,688,863 A | 11/1997 | Kirchmeyer et al. | 524/839 |
| 5,763,502 A | 6/1998 | Barker et al. | 521/174 |
| 5,830,541 A | 11/1998 | Carswell et al. | 427/475 |
| 6,017,997 A * | 1/2000 | Snow et al. | 524/591 |

\* cited by examiner

POLYURETHANE FILMS PREPARED FROM POLYURETHANE DISPERSIONS

This application claims the benefit of U.S. Serial No. 60/129,279 filed Apr. 14, 1999.

BACKGROUND OF THE INVENTION

This invention particularly relates to polyurethane films prepared from aqueous dispersions.

While ostensibly reactive with water, it has long been known that polyisocyanate polymers can be used to prepare aqueous polyurethane dispersions. Polyurethane dispersions are generally prepared by chain extending the reaction product of an organic diisocyanate or polyisocyanate and an organic compound having two or more active hydrogen atoms such as polyalkylene ether glycols, poly(alkylene ether-alkylene thioether) glycols, alkyd resins, polyesters and polyester amides, often using an organic solvent. The diisocyanate is used in stoichiometric excess so that the reaction product, also referred to as a polyurethane/urea/thiourea prepolymer, is isocyanate terminated. Examples of polyurethane prepolymer preparations are described in U.S. Pat. Nos. 3,178,310, 3,919,173, 4,442,259, 4,444,976, and 4,742,095, among others.

Polyurethane dispersions are reported as being useful for preparing such diverse materials as: coatings and bonds in U.S. Pat. No. 4,292,226; flexible solvent barriers in U.S. Pat. No. 4,431,763; adhesives in U.S. Pat. No. 4,433,095; and films in U.S. Pat. No. 4,501,852. Films, or rather the process of dipping to make a film, can be a part of the processes for making many articles. Examples of film applications include exam gloves, organ bags, condoms, ostomy bags, and the like. While it is known that such applications can be made with polyurethane dispersions, conventional polyurethane dispersions have sometimes been found to have insufficient physical or handling properties to make them a preferred material for such applications. Also, the use of a solvent can have adverse effects for some applications.

Polyurethanes are the reaction product of a polyalcohol- and a polyisocyanate. Typically, the polyisocyanates used to prepare polyurethane dispersions have been aliphatic isocyanates such are disclosed in U.S. Pat. No. 5,494,960. Aromatic polyisocyanates such as toluene diisocyanate (TDI) and methylene diphenyldiisocyanate (MDI) as well as polymethylene polyphenylisocyanate are also known to be useful.

Accordingly, it would be desirable in the art of preparing polyurethane films from aqueous dispersions, to prepare such films which have physical and handling properties sufficient for their use in conventional film applications. It would be further desirable if such films could be prepared with dispersions which are, in turn, prepared in the absence of organic solvents. It would be particularly desirable to prepare such dispersions which have enhanced shear stability.

SUMMARY OF THE INVENTION

In one aspect, the present invention is a process for preparing a polyurethane film comprising the steps of preparing a nonionic prepolymer formulation, the prepolymer formulation comprising a diisocyanate, an active hydrogen containing material, and a monol; and preparing an aqueous dispersion of the prepolymer, in the presence of a surfactant. Both steps occur in the substantial absence of an organic solvent.

In a second aspect, the present invention is a polyurethane film comprising a film prepared with a process which includes preparing a polyurethane dispersion from a formulation including from 0.1 to 2.0 percent by weight of a monol.

In a third aspect, the present invention is an aqueous polyurethane dispersion useful for preparing polyurethane films. The dispersion comprises the product of dispersing in water a nonionic polyurethane prepolymer prepared from a prepolymer formulation including a diisocyanate, one or more diols and a monol. The dispersion is formed in a two or more step process wherein, in a first step the prepolymer is formed and, in a subsequent step, an aqueous dispersion of the prepolymer is formed, in the presence of a surfactant. Both steps occur in the substantial absence of an organic solvent.

The present invention has the advantage of having increased shear stability. The dispersions of the present invention do not settle or coagulate prematurely. Moreover, the films of the present invention do not include the dermal irritants which occur in natural rubber latex. The films and dispersions of the present invention are thus suitable for use in applications such as, for example, medical applications.

DESCRIPTION OF THE PREFERRED EMBODIMENTS

The films of the present invention can be prepared from any polyurethane prepolymer dispersion which is sufficiently stable to be stored but not so stable that it cannot be electrodeposited or coagulated. The dispersion can be prepared in any way which results in a dispersion which can be used to prepare a film having acceptable physical properties for the anticipated use of the film. The dispersions can be done by a batch process or by a continuous process. If done by a batch process, preferably, the dispersion in done by an inverse phase process wherein a small amount of water, including a small amount of anionic surfactant, is first added to a continuous prepolymer phase and mixed and then more water is added with mixing until the phase inverts.

When dispersions of the present invention are prepared by means of a continuous process, preferably they are prepared by means of a high internal phase ratio (HIPR) process. Such processes are known and are disclosed in, for Example, U.S. Pat. No. 5,539,021 to Pate, et al., and WO 98/41552 A1 to Jakubowski, et al. When prepared by either method, the resulting dispersion should have a particle size sufficient to make the dispersion stable. The dispersions of the present invention will have a particle size of from 0.9 to about 0.05, preferably from about 0.5 to about 0.07 and even more preferably, from about 0.4 to about 0.10 microns. Most preferably, the particle size of the dispersions of the present invention is about 0.15 microns.

The polyurethane dispersions of the present invention are prepared from a nonionic polyurethane prepolymer. The nonionic prepolymers of the present invention are prepared with an aliphatic or aromatic diisocyanate. Preferably, the diisocyanate is an aromatic diisocyanate selected from the group consisting of MDI, TDI and mixtures thereof. TDI can be generally used with any commonly available isomer distribution. The most commonly available TDI has an isomer distribution of 80 percent of the 2,4 isomer and 20 percent of the 2,6 isomer. For the purposes of the present invention, TDI with other isomer distributions can also be used, but often at significantly higher cost.

When MDI is used with the formulations of the present invention, it preferably has a P,P' isomer content of from about 99 percent to about 90 percent. Even more preferably, when MDI is used with the formulations of the present invention, it preferably has a P,P' isomer content of from about 98 to about 92 percent. Most preferably, when MDI is used with the formulations of the present invention, it preferably has a P,P' isomer content of about 94 percent. While MDI with such isomer distributions can be prepared by distillation during the MDI process, it can also be prepared by admixing commonly available products such as ISONATE 125M* and ISONATE 500P*. (*ISONATE 125M and ISONATE 50OP are trade designations of The Dow Chemical Company.)

When mixtures of TDI and MDI are used to prepare the prepolymers of the present invention, they are admixed in a ratio of MDI to TDI of from about 99 percent MDI to about 80 percent MDI. More preferably, when mixtures of TDI and MDI are used to prepare the prepolymers of the present invention, they are admixed in a ratio of MDI to TDI of from about 98 percent MDI to about 90 percent MDI. Most preferably, when mixtures of TDI and MDI are used to prepare the prepolymers of the present invention, they are admixed in a ratio of MDI to TDI of about 96 percent MDI. Preferably the prepolymers of the present invention are prepared with MDI or mixtures of MDI and TDI. Even more preferably, the prepolymers of the present invention are prepared with MDI as the only aromatic diisocyanate.

In one embodiment of the present invention, the prepolymers of the present invention are prepared from a formulation that includes an active hydrogen containing material. In a preferred embodiment of the present invention, the active hydrogen containing material is a mixture of diols. One component of the diol mixture is a high molecular weight diol, and preferably a high molecular weight polyoxypropylene diol having an ethylene oxide capping of from 0 to 25 weight percent. The other component of the diol mixture is a low molecular weight diol. The polyether diols of the formulations of the present invention can be prepared by any method known to those of ordinary skill in the art of preparing polyether polyols to be useful for preparing such diols. Preferably, the polyether diols are prepared by the alkoxylation of a difunctional initiator in the presence of a basic catalyst. For example, a polyether useful with the present invention is a product resulting from a two step alkoxylation of ethylene glycol with first propylene oxide and then ethylene oxide, in the presence of KOH as a catalyst.

The high molecular weight polyether diol component of the diol mixture of the prepolymer formulations of present invention is a polyoxypropylene diol having an ethylene oxide capping of from 0 to 25 weight percent. Preferably, the molecular weight of this component is from about 1,000 to about 4,000, more preferably from about 1,200 to about 2,500, and most preferably from about 1,800 to about 2,200. As stated, the polyether diol is capped with from 0 to 25 percent ethylene oxide. Preferably, the high molecular weight diol is capped with from about 5 to about 25 percent ethylene oxide, and more preferably, from about 10 to about 15 percent ethylene oxide.

The low molecular weight diol component of some of the prepolymer formulations of the present invention can also be a product of alkoxylating a difunctional initiator. Preferably, this component is also a polyoxypropylene diol, but it can also be a mixed ethylene oxide propylene oxide polyol, as long as at least 75 weight percent of the alkoxides used, if present, is propylene oxide. Diols such as propylene glycol, diethylene glycol, dipropylene glycol, and the like, can also be used with the formulations of the present invention. The low molecular weight diol component of the prepolymer formulations, if present, has a molecular weight of from about 60 to about 750, preferably from about 62 to about 600, and most preferably, from about 125 to about 500.

The prepolymers of the present invention can be prepared in any way known to those of ordinary skill in the art of preparing polyurethane prepolymers to useful for preparing such prepolymers. Preferably the aromatic diisocyanate and polyether diol mixture are brought together and heated under reaction conditions sufficient to prepare a polyurethane prepolymer. The stoichiometry of the prepolymer formulations of the present invention is such that the diisocyanate is present in excess. Preferably, the prepolymers of the present invention have an isocyanate content (also known as %NCO) of from about 1 to about 9 weight percent, more preferably from about 2 to about 8 weight percent, and most preferably from about 3 to about 7 weight percent.

The prepolymers of the present invention are optionally extended with a difunctional amine chain extender when the active hydrogen containing material of the prepolymer formulation is a mixture of a low molecular weight diol and a high molecular weight polyether diol. The difunctional amine chain extender is not optional but required when the active hydrogen containing material of the prepolymer formulation is a high molecular weight polyether diol and does not include a low molecular weight diol. Preferably, the difunctional amine chain extender is present in the water used to make the dispersion. When used, the amine chain extender can be any isocyanate reactive diamine or amine having another isocyanate reactive group and a molecular weight of from about 60 to about 450, but is preferably selected from the group consisting of: an aminated polyether diols; piperazine, aminoethylethanolamine, ethanolamine, ethylenediamine and mixtures thereof. Preferably, the amine chain extender is dissolved in the water used to make the dispersion.

The prepolymers of the present invention are nonionic. There are no ionic groups incorporated in or attached to the backbones of the prepolymers used to prepare the films of the present invention. The anionic surfactant used to prepare the dispersions of the present invention is a external stabilizer and is not incorporated into the polymer backbones of the films of the present invention.

The prepolymers of the present invention are dispersed in water which contains a surfactant. Preferably the surfactant is an anionic surfactant. In the practice of preparing the dispersions of the present invention, the surfactant is preferably introduced into water prior to a prepolymer being dispersed therein, but it is not outside the scope of the present invention that the surfactant and prepolymer could be introduced into the water at the same time. Any anionic surfactant can be used with the present invention, but preferably the anionic surfactant is selected from the group consisting of sulfonates, phophates, carboxylates. More preferably, the anionic surfactant is sodium dodecyl benzene sulfonate, dodecyl sodium sulfonate, sodium dodecyl diphenyl oxide disulfonate, sodium n-decyl diphenyl oxide disulfonate, isopropylamine dodecylbenzenesulfonate, or sodium hexyl diphenyl oxide disulfonate, and most preferably, the anionic surfactant is sodium dodecyl benzene sulfonate.

The dispersions of the present invention can have a solids level of from about 30 weight percent to about 60 weight percent. Films will not necessarily be prepared from dispersions having this level of solids. While the dispersions themselves will be stored and shipped at as high a solids content as possible to minimize storage volume and shipping costs, the dispersions can desirably be diluted prior to final use. The thickness of the film to be prepared and the method of coagulating the polymer onto a substrate will usually dictate what solids level is needed in the dispersion. When preparing films, the dispersions of the present invention can be at a weight percent solids of from 5 to about 60 percent, preferably from about 10 to about 40 percent, and, most preferably, from about 15 to about 25 weight percent when preparing examination gloves. For other applications, the film thickness and corresponding solids content of the dispersion used can vary.

The polyurethane dispersions of the present invention are prepared by including in the prepolymer formulation a monol. Preferably the monol is a polyether and more preferably is a polyoxyethylene polyether monol. Preferably the monol has a molecular weight of from 500 to 1500, and more preferably from 800 to 1200. Preferably the monol is included in the prepolymer formulation at a concentration of from 0.1 to 2.0 percent by weight, based on the total weight of the prepolymer. More preferably the monol is included at a concentration of from 0.2 to 1.5 percent by weight, and most preferably the monol is included at a concentration of from 0.3 to 0.99 percent by weight. Too much monol in the prepolymer will result in a dispersion which can not be coagulated using calcium nitrate and the like. Preferably, the monol is added after the diol mixture and the diisocyanate are prereacted.

For many film applications, it is necessary that the polymer used have physical properties similar to the more conventional materials used in those applications. For example, for an exam glove application, the films of the present invention can have a tensile set of less than 5%. One significant advantage of the films of the present invention over natural latex in applications such as exam gloves is that the films of the present invention have significantly lesser risk of inducing an allergic reaction in those wearing the gloves.

Another benefit of films of the present invention is that they can be prepared such that they are self-releasing. In the art of preparing exam gloves, this ability is also known as "powder free" in reference to the fact that such gloves are occasionally prepared and sold with a layer of talcum powder, corn starch, or the like, to keep the polymer from adhering to itself, thereby making it easier to put on the gloves. The films of the present invention can be made self releasing by inclusion of a wax in the prepolymer formulation. Preferably the wax is carnauba wax and the like. It is preferable that the wax to be used be selected from those that are not likely to induce an allergic reaction in skin that comes in contact therewith. Therefore, food grade waxes are particularly preferred for this application. When used, the waxes are preferably included in the water used to disperse the prepolymer formulation at a concentration of from about 0.1 to about 2 weight percent.

In addition to the waxes already mentioned, other additives can be included in the films of the present invention. Any additive which is known to those of ordinary skill in the art of preparing films from dispersion to be useful can be used with the films of the present invention so long as their presence does not degrade the properties of the film so much that the film is no longer fit for its intended purposes. The additives can also be incorporated into the films in any way known to be useful including, but not limited to inclusion in the prepolymer formulation and inclusion in the water used to make the dispersion. For example titanium dioxide is useful for coloring films of the present invention. Other useful additives include calcium carbonate, silicon oxide, defoamers, biocides, carbon particles, and the like.

The present invention has applicability in, for example, gloves, condoms, medical bags, angioplasty balloons, medical bellows, face masks, blood pressure cuffs and the like. The present invention also has applicability in parts associated with drug delivery mechanisms, including catheters, medical tubing, gaskets and o-rings. Moreover, the present invention has applicability in many non-medical items, such as, for example, non-medical gloves, swim caps, tool handle grips, industrial caps and plugs, windshield wiper boots, toy balloons, toys, electrical parts, covers and gaskets.

EXAMPLES

The following examples are for illustrative purposes only and are not intended to limit the scope of the claimed invention. Percentages are in weight percents unless otherwise stated.

The following materials are used in the examples below:

Polyether Polyol is a 2000 molecular weight polyoxypropylene diol having 12.5 percent ethylene oxide end capping.

Low Molecular Weight Diol is a 425 molecular weight all polyoxypropylene diol.

Monol is a 950 molecular weight polyoxyethylene monol.

Polyisocyanate is MDI having a 4,4' isomer content of 98 percent and an isocyanate equivalent weight of 125.

Surfactant is sodium dodecyl benzene sulfonate.

Diamine is a 230 molecular weight polyoxypropylene diamine.

Example 1

A polyurethane prepolymer is prepared by admixing 53.16 parts of Polyether Polyol, 0.25 parts monol and 13.29 parts of Low Molecular Weight Diol and then heating the admixture to 50° C. This material is then admixed with 33.3 parts of Polyisocyanate which has also been warmed to 50° C. A small amount of benzoyl chloride is added to neutralize residual base in the polyols. The admixture is then heated at 70° C. for 4 hours and then tested to determine NCO content. The NCO content is 6.1 percent.

A polyurethane dispersion is prepared by admixing 38.7 parts of the prepolymer admixed with a small amount of water and 1.3 parts Surfactant using a high shear mixer running at about 2500 rpm. Additional water is slowly added until a phase inversion is observed. Then additional water added to bring the total water content to 60 parts. The dispersion is filtered and allowed to stand overnight.

The dispersion is then tested for stability by placing 75 grams of dispersion in an 8 oz jar and stirring at 2000 rpm for up to 30 minutes. The point at which the dispersion coagulates is recorded in the table.

A film is then prepared by a coagulation process by heating a steel plate in and oven until it reached a temperature of from 100 to 120° F. (38–49° C.). The plate is then dipped into a 20 percent solution of calcium nitrate in 1:1 by weight of water and methanol which also included about 1 wt % of a ethoxylated octylphenol surfactant. The plate is then placed into an oven at 230° F. (110° C.) for approximately 15 minutes to form a very thin film of calcium nitrate on the plate. The plate is allowed to cool to 105° F. (40° C.) and then dipped into the polyurethane dispersion diluted to 30% solids with deionized water and removed (total dwell time is approximately 20 sec). The plate is held for 5 minutes at room temperature to allow the film to generate enough gel strength, followed by leaching in a water bath at 115° F. (46°

C.) for 10 minutes. Both sides of the plate is then sprayed with water at 115° F. (40° C.) for two additional minutes. The plate is then heated to 230° F. (110° C.) for 30 minutes and then cooled to ambient temperature. A polyurethane film is peeled from the substrate and tested using a tensile bar of overall length 1.5", width of narrow section =0.187", and gauge length =0.61". Testing results are presented in the table.

Examples 2, 3, and Comparative Example 4

Prepolymers, dispersions and films are prepared and tested substantially identically to those of Example 1 except the formulation was changed as shown in the table. Testing results are presented in the table.

TABLE

| Example | 1 | 2 | 3 | 4 | Comparative 5 |
|---|---|---|---|---|---|
| Polyether Polyol | 53.16 | 52.96 | 52.76 | 52.56 | 53 |
| Low Mwt Diol | 13.29 | 13.24 | 13.19 | 13.14 | 13.7 |
| Polyisocyanate | 33.3 | 33.3 | 33.3 | 33.3 | 33.3 |
| Monol | 0.25 | 0.50 | 0.75 | 1.00 | 0.0 |
| Solidified at seconds | 505 | 845 | Did not solidify (>1800) | Did not solidify (>1800) | 350 |
| Tensile (psi) | 4373 | 4296 | 4883 | Did not film form consistently via coagulation process - no testing possible | 5392 |
| % Elong at Break | 554 | 508 | 535 | | 547 |
| Stress at 100% | 468 | 542 | 598 | | 529 |
| Stress at 200% | 742 | 901 | 951 | | 880 |
| Stress at 500% | 3218 | 4043 | 3882 | | 3912 |

What is claimed is:

1. A process for preparing a polyurethane film comprising the steps of:
   preparing a nonionic prepolymer formulation, the prepolymer formulation comprising a diisocyanate, an active hydrogen containing material, and a polyether monol, the monol comprising polyoxyethylene and being present in an amount effective for improving shear stability of a dispersion prepared from the prepolymer formulation but no more than 0.99 percent by weight of prepolymer formulation;
   dispersing the prepolymer formulation in water in the presence of a surfactant to prepare a coagulatable dispersion, the coagulatable dispersion having improved shear stability over a dispersion prepared without a polyether monol; and
   forming a film by coagulating or electrodepositing the coagulatable dispersion onto a substrate,
   wherein the three steps occur in the substantial absence of an organic solvent.

2. The process according to claim 1, wherein the diisocyanate is either:
   (1) an aliphatic diisocyanate; or
   (2) an aromatic diisocyanate selected from the group consisting of MDI, TDI and mixtures thereof.

3. The process according to claim 1, wherein the active hydrogen containing material is either:
   (a) a mixture of a high molecular weight diol and a low molecular weight diol; or
   (b) a high molecular weight diol, wherein when the active hydrogen containing material does not include a low molecular weight diol, the prepolymer is dispersed in water which includes a difunctional amine chain extender.

4. The process according to claim 1 wherein the monol has a molecular weight of from 500 to 1500.

5. The process according to claim 1 wherein the monol is a polyoxyethylene polyether monol.

6. The process according to claim 1, wherein the resulting film has a shape of a glove, a condom, an angioplasty balloon, a medical bag or a catheter.

7. A polyurethane film comprising a film prepared with a process which includes (1) preparing a coagulatable polyurethane dispersion from a prepolymer formulation including a polyether monol comprising polyoxyethylene and being present in an amount effective for improving shear stability of a dispersion prepared from the prepolymer formulation but no more than 0.99 weight percent, the shear stability being improved over shear stability of a dispersion prepared without a polyether monol, and (2) coagulating or electrodepositing the dispersion onto a substrate to form a film.

8. The polyurethane film according to claim 7 wherein the monol is a polyoxyethylene polyether monol.

9. A coagulatable aqueous polyurethane dispersion useful for preparing polyurethane films comprising the product of dispersing in water a nonionic polyurethane prepolymer prepared from a prepolymer formulation including a diisocyanate, one or more diols and a polyether monol, the monol comprising polyoxyethylene and being present in an amount effective for improving shear stability of a dispersion prepared from the prepolymer formulation but no more than 0.99 percent by weight of prepolymer formulation wherein:
   the dispersion is formed in a two or more step process wherein,
      (1) in a first step the prepolymer is formed and, in a subsequent step,
      (2) an aqueous dispersion of the prepolymer is formed, in the presence of a surfactant, both steps occurring in the substantial absence of an organic solvent; and
   the dispersion has improved shear stability over a dispersion prepared without a polyether monol and the dispersion coagulates in the presence of calcium nitrate.

10. The dispersion of claim 9 wherein the monol has a molecular weight of from 500 to 1500.

11. A process for preparing a coagulatable polyurethane dispersion comprising the steps of:
   preparing a nonionic prepolymer formulation comprising a diisocyanate, an active hydrogen-containing material, and a polyether monol, the monol comprising polyoxyethylene and being present in an amount effective for improving shear stability of a dispersion prepared from the prepolymer formulation but no more than 0.99 percent by weight of prepolymer formulation; and
   dispersing the prepolymer formulation in water in the presence of a surfactant to prepare a coagulatable polyurethane dispersion, the coagulatable dispersion having improved shear stability over a dispersion prepared without a polyether monol;
   wherein both steps occur in the substantial absence of organic solvent and the dispersion coagulates in the presence of calcium nitrate.

12. The process according to claim 11, wherein the diisocyanate is either:

(1) an aliphatic diisocyanate or (2) an aromatic diisocyanate selected from the group consisting of MDI, TDI, and mixtures thereof.

13. The process according to claim 11, wherein the active hydrogen containing material is either:

(a) a mixture of a high molecular weight diol and a low molecular weight diol; or (b) a high molecular weight diol, wherein when the active hydrogen containing material does not include a low molecular weight diol, the prepolymer is dispersed in water which includes a difunctional amine chain extender.

14. The process according to claim 11, wherein the monol has a molecular weight of from 500 to 1500.

15. The process according to claim 11, wherein the monol is a polyoxyethylene polyether monol.

16. The process according to claim 11, wherein the coagulatable polyurethane dispersion is coagulated onto a substrate to prepare a film having a shape of a glove, a condom, an angioplasty balloon, a medical bag, or a catheter.

17. The process of claim 1, wherein the polyether monol is present in an amount of between 0.1 and 0.99 percent by weight of prepolymer formulation.

18. The process of claim 1, wherein the polyether monol is present in an amount of between 0.3 and 0.99 percent by weight of prepolymer formulation.

19. The process of claim 11, wherein the polyether monol is present in an amount of between 0.1 and 0.99 percent by weight of prepolymer formulation.

20. The process of claim 11, wherein the polyether monol is present in an amount of between 0.3 and 0.99 percent by weight of prepolymer formulation.

21. The dispersion of claim 9, wherein the polyether monol is present in an amount of between 0.1 and 0.99 percent by weight of prepolymer formulation.

22. The dispersion of claim 9, wherein the polyether monol is present in an amount of between 0.3 and 0.99 percent by weight of prepolymer formulation.

23. A shear-stable polyurethane dispersion comprising a nonionic polyurethane prepolymer dispersed in water, the prepolymer comprising a diisocyanate, at least one diol, and a polyether monol comprising polyoxyethylene, wherein the dispersion has improved shear stability over a dispersion prepared without a polyether monol and the dispersion is coagulatable.

24. A shear-stable polyurethane dispersion comprising a nonionic polyurethane prepolymer dispersed in water, the prepolymer comprising a diisocyanate, at least one diol, and a polyether monol comprising polyoxyethylene, wherein the dispersion has improved shear stability over a dispersion prepared without a polyether monol and the dispersion is coagulatable.

* * * * *